United States Patent Office 2,888,441
Patented May 26, 1959

2,888,441

CHELATING RESINS HAVING α-AMINOCARBOXYLIC ACID GROUPS ON A POLYMERIZED VINYLBENZYLAMINE RESIN STRUCTURE

Leo R. Morris, Midland, Mich., assignor to The Dow Chemical Company, Midland, Mich., a corporation of Delaware No Drawing. Application October 12, 1956
Serial No. 615,486

4 Claims. (Cl. 260—78)

This invention concerns the preparation of chelating resinous polymers having the recurring group

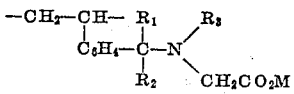

wherein the symbol $R_1$ represents a radical selected from the group consisting of —H, —$CO_2M$, and —$CH_2CO_2M$, the symbol $R_2$ represents a radical selected from the group consisting of —H and —$CH_3$, the symbol $R_3$ represents a radical selected from the group consisting of —H, —$CH_3$, —$CH_2$—$C_6H_4$—CH=$CH_2$, —$CH_2$—$C_6H_4$—$CH_2$—$\overset{|}{C}H$—$\overset{|}{C}H_2$ —$CH_2CO_2M$, —$CH_2CH_2CO_2M$
—$CH(CO_2M)CH_2CO_2M$, $CH_2CH_2$—N($CH_2CO_2M$)$_2$
—$CH_2CH_2CH$—N($CH_2CO_2M$)$_2$ and

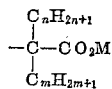

where $n$ is an integer from 1 to 4 and $m$ is an integer from 0 to 2, and M is a member of the group consisting of hydrogen, ammonium bases, and metals.

An object of this invention is to provide chelating resins having the recurring group just given.

A particular object is to provide an improved method for making such resins.

Another object is to provide a method for making such resins from polymeric starting materials.

A more specific object is to provide a method for making such resins from polymerizable vinylbenzylamino compounds.

A further object is to provide such resins wherein there is a relatively high proportion of active α-aminocarboxylic acid groups.

Further objects and advantages of the invention will be evident in the following description.

The objects of this invention have been attained by polymerizing a polymerizable composition comprising an appreciable proportion of at least one monomeric vinylbenzylamino compound having the formula

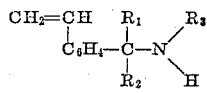

thereby obtaining a resinous polymer having therein an appreciable proportion of the recurring group

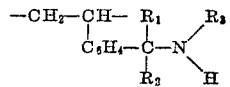

wherein the symbols have the meanings previously given, and reacting the resulting resinous polymer with a haloacetic acid, i.e. chloroacetic acid or bromoacetic acid, in an alkaline aqueous reaction mixture. Specific examples of polymers having a recurring vinylbenzylamino group in polymerically combined form and of polymers having N-carboxymethyl groups made therefrom in accordance with this invention are as follows:

Polymers of N-(ar-vinylbenzyl)iminodiacetic acid are obtained by reaction of a haloacetic acid with polymers of ar-vinylbenzylamine;

Polymers of N-carboxymethyl-N-(ar-vinylbenzyl)aspartic acid are obtained by reaction of a haloacetic acid with polymers of N-(ar-vinylbenzyl)aspartic acid;

Polymers of 2-(vinylphenyl)iminodiacetic acid are obtained by reaction of a limited proportion of a haloacetic acid with polymers of 2-(vinylphenyl)glycine;

Polymers of 2-(vinylphenyl)nitrilotriacetic acid are obtained by reaction of an excess of haloacetic acid with polymers of 2-(vinylphenyl)glycine;

Polymers of N-carboxymethyl-N-(ar-vinylbenzyl)-alanine are obtained by reaction of a haloacetic acid with polymers of N-(ar-vinylbenzyl)alanine;

Polymers of N-carboxymethyl-N-(ar-vinylbenzyl)-β-alanine are obtained by reaction of a haloacetic acid with polymers of N-(ar-vinylbenzyl)-β-alanine;

Polymers of N-carboxymethyl-N-(ar-vinylbenzyl)-2-aminobutyric acid are obtained by reaction of a haloacetic acid with polymers of N-(ar-vinylbenzyl)-2-aminobutyric acid;

Polymers of N-carboxymethyl-N-(ar-vinylbenzyl)-2-aminoisobutyric acid are obtained by reaction of a haloacetic acid with polymers of N-(ar-vinylbenzyl)-2-aminoisobutyric acid;

Polymers of N-carboxymethyl-N-(ar-vinylbenzyl)isovaline are obtained by reaction of a haloacetic acid with polymers of N-(ar-vinylbenzyl)isovaline;

Polymers of N-carboxymethyl-N-(ar-vinylbenzyl)valine are obtained by reaction of a haloacetic acid with polymers of N-(ar-vinylbenzyl)-valine;

Polymers of N-carboxymethyl-N-(ar-vinylbenzyl)norvaline are obtained by reaction of a haloacetic acid with polymers of N-(ar-vinylbenzyl)norvaline;

Polymers of N-carboxymethyl-N-(ar-vinylbenzyl)leucine are obtained by reaction of a haloacetic acid with polymers of N-(ar-vinylbenzyl)leucine;

Polymers of N-carboxymethyl-N-(ar-vinylbenzyl)isoleucine are obtained by reaction of a haloacetic acid with polymers of N-(ar-vinylbenzyl)isoleucine;

Polymers of N-carboxymethyl-N-(ar-vinylbenzyl)-2-(ar-vinylphenyl)glycine are obtained by reaction of a haloacetic acid with polymers of N-(ar-vinylbenzyl)-2-(ar-vinylphenyl)glycine;

Polymers of N,N-bis(ar-vinylbenzyl)glycine are obtained by reaction of a haloacetic acid with polymers of bis(ar-vinylbenzyl)amine.

The haloacetic acid used can be either chloroacetic acid or bromoacetic acid and, for reasons of economics, is preferably chloroacetic acid.

The starting polymers, and the polymeric products made therefrom, all contain a benzyl group attached through the benzene ring thereof to a chain of polymeric vinyl groups and correspond to the monomeric ar-vinylbenzyl compound starting material. The point of attachment of the benzyl group to the polyvinyl chain in the product can be fixed by selection of the corresponding ar-vinylbenzylamino compound as starting material. The individual isomers, i.e. an o-vinylbenzyl compound, a m-vinylbenzyl compound, or a p-vinylbenzyl compound, or a mixture of two or more of such isomers can be used as starting materials to obtain the corresponding isomers or mixture of isomers of polymeric N-carboxymethyl-N-(ar-vinylbenzyl)amino compounds as products of this invention. Furthermore, copolymers of two or more different N-(ar-vinylbenzyl)amino compounds, or copolymers of one or more N-(ar-vinylbenzyl)amino compounds and one or more other ethylenically unsaturated compounds can be reacted with a haloacetic acid to obtain the corresponding copolymeric N-carboxymethyl-N-(ar-vinylbenzyl)amino compounds.

The polymeric N-(ar-vinylbenzyl)amino compounds are prepared by subjecting to conditions conducive to polymerization a polymerizable composition comprising an appreciable proportion of at least one N-(ar-vinylbenzyl)amino compound. The polymerization can be carried out in mass, i.e. in the substantial absence of any diluent, in solution in solubilizing liquids, or while suspended in non-solvent liquid media. The polymerization of the ethylenically unsaturated monomer composition is accelerated by heat and is catalyzed by exposure to activating radiations and by contact with free radical catalysts such as $\alpha,\alpha'$-azobisisobutyronitrile and the peroxygen compounds such as cumene hydroperoxide and potassium persulfate.

The reaction between the polymeric N-(ar-vinylbenzyl)amino compound and the haloacetic acid is preferably carried out by warming a dispersion of the polymeric N-(ar-vinylbenzyl)amino compound starting material in an aqueous solution of the haloacetic acid, e.g. at temperatures in the range from room temperature to the boiling point of the aqueous solution, and adding an alkali, such as an alkali metal carbonate or hydroxide, e.g. sodium carbonate, potassium carbonate, sodium hydroxide, or potassium hydroxide, as needed to provide an alkaline aqueous reaction medium, i.e. one having a pH value of at least 7, preferably in the range from 7 to 10.

The polymeric products of this invention are chelating agents, i.e. they form stable complex chelate structures with many polyvalent and some monovalent metal ions. These resinous chelating agents are used to remove chelate-forming metal ions from solutions thereof, even extremely dilute solutions, to separate chelate-forming metal ions from non-chelate-forming metal ions, and to separate mixtures of chelate-forming metal ions on the basis of the relative strength and stability of their respective chelate structures.

The following examples illustrate the polymeric N-carboxymethyl-N-(ar-vinylbenzyl)amino compounds and the method of obtaining the same according to this invention, but are not to be construed as limiting the invention.

*Example 1*

A mixture of 40 g. technical vinylbenzylamine, 4.0 g. of technical divinylbenzene, and 0.4 g. of $\alpha,\alpha'$-azobisisobutyronitrile was dispersed into a mixture of 60 ml. of water and 8 ml. of a 0.1 percent by weight aqueous solution of methoxy cellulose. The technical vinylbenzylamine contained about 10 percent by weight of bis(vinylbenzyl)amine, the amines being a mixture of isomers consisting essentially of approximately 65 percent by weight para-isomer and 35 percent ortho-isomer. The technical divinylbenzene was approximately 55 percent by weight divinylbenzene, 35 percent ethylvinylbenzene, and 10 percent diethylbenzene, these several compounds being mixtures of isomers, mostly meta- and para-isomers. After warming the dispersion to 70° C. and stirring for 15 minutes, there was added 8 ml. of a 1 percent by weight aqueous solution of aluminum sulfate, and stirring was continued for 18 hours. There were thereby obtained beads of solid, resinous polymer that were collected and washed successively with water, dilute hydrochloric acid and acetone. The beads of resin were dried in vacuum.

After screening the resin to classify the particles, 3.7 g. of the beads having diameters less than 0.25 mm. was dispersed in 15 g. of a water solution containing 5 g. of chloroacetic acid. After heating the dispersion for 10 minutes on a steam bath, sodium carbonate was added until the pH value was in the range from 8 to 10. The dispersion was heated on the steam bath for 18 hours with occasional addition of sodium carbonate as needed to maintain the pH value in the range from 8 to 10. The resulting beads of carboxymethylated vinylbenzylamine polymer were collected and washed successively with water, dilute hydrochloric acid, water, and acetone before oven drying. The solid resinous copolymer product contained a plurality of N-substituted iminodiacetic acid groups and N,N-bis-substituted glycine groups on a crosslinked polymer structure. The resin was insoluble in water and was capable of sequestering chelate-forming metal ions from aqueous solutions thereof, as shown by a test described hereinafter in Example 6.

In place of chloroacetic acid in the above example there can be used bromoacetic acid with substantially the same results. In place of sodium carbonate, there can be used another alkali such as another alkali metal carbonate or an alkali metal hydroxide. In place of the polymeric ar-vinylbenzylamine, there can be used another polymeric N-(ar-vinylbenzyl)amino compound as identified hereinbefore to obtain the corresponding N-carboxymethyl derivative thereof.

*Example 2*

A solution of 132 g. of p-vinylbenzaldehyde in 250 ml. of methanol was added to a solution of 53.5 g. of ammonium chloride and 51.0 g. of sodium cyanide in 100 ml. of concentrated ammonium hydroxide and 200 ml. of water. To the reaction mixture was added approximately one gram of tert-butylcatechol and the reaction mixture was heated with intermittent stirring at approximately 50° C. for one hour. The resulting reaction mixture was diluted with an equal volume of water, and treated with a solution of 160 g. of sodium hydroxide in one liter of water and 250 ml. of methanol.

The resulting mixture was heated at reflux for one hour, cooled, and extracted with 200 ml. of benzene. The benzene extract was in turn extracted with a small amount of 1 N sodium hydroxide solution. The sodium hydroxide extract was combined with the main aqueous reaction mixture and the combined mixture was acidified with dilute hydrochloric acid to a pH value of approximately 6. The yellow solid precipitate was collected, washed with water, and redissolved in dilute hydrochloric acid. After treatment with decolorizing carbon and filtration through filter aid, the clear acid solution was partially neutralized with sodium hydroxide solution to a pH value of approximately 6. The precipitated solid was collected, washed and dried to provide 37.9 g. of 2-(p-vinylphenyl)glycine.

A solution of 2 g. of the 2-(p-vinylphenyl)glycine and 0.01 g. of sodium persulfate in 20 ml. of 1 N NaOH was heated to incipient reflux. After 72 hours, 0.02 g. of sodium persulfate was added. After another 120 hours at incipient reflux, 0.05 g. of $\alpha,\alpha'$-azobisisobutyronitrile was added. Twenty four hours later, 0.05 g. of $\alpha,\alpha'$-azobisisobutyronitrile was added. After a total reaction time of 168 hours, the reaction mixture was cooled, acidified to a pH value of approximately 5 by addition thereto of dilute hydrochloric acid, and was filtered. The precipitated solid was washed with water and dried, whereby there was obtained polymerized 2-(p-vinylphenyl)glycine.

The polymerized 2-(p-vinylphenyl)glycine is dispersed in an alkaline aqueous medium, such as a sodium hydroxide solution, and therein reacted with an alkali haloacetate, such as sodium chloroacetate, to obtain a polymeric 2-(p-vinylphenyl)nitriloacetic acid salt.

*Example 3*

A mixture of 2 g. of 2-(p-vinylphenyl)glycine, 50 ml. of water and 10 ml. of dioxane was heated to 70° C. A total of 1.7 g. of ar-vinylbenzyl chloride was added in two portions about 15 minutes apart while the reaction mixture was stirred and the temperature was maintained about 70° C. The ar-vinylbenzyl chloride was a mixture of approximately 65 percent by weight p-vinylbenzyl chloride and 35 percent o-vinylbenzyl chloride. The pH value of the reaction mixture was maintained between 9 and 11 by adding 2 ml. of 50 percent by weight sodium hydroxide solution dropwise as needed over a one hour period. After 4.5 hours of heating and stirring, the reaction mixture was cooled and filtered. The filtrate was extracted with ether and the aqueous layer was acidified with hydrochloric acid to a pH value of about 5. A precipitated pale yellow solid was collected and washed with water. The solid was redissolved in dilute aqueous alkali and reprecipitated with hydrochloric acid. The reprecipitated N - (ar-vinylbenzyl)-2-(p-vinylphenyl)glycine was collected, washed and dried.

An alkaline (sodium hydroxide) solution of 10 percent by weight of the N-(ar-vinylbenzyl)-2-(p-vinylphenyl)glycine and 0.2 percent by weight $\alpha,\alpha'$-azobisisobutyronitrile was heated at 70° C. for four days to obtain a gel which was dialyzed against water. The dialyzed gel was collected and dried to obtain a cross-linked homopolymer of N-(ar-vinylbenzyl)-2-(p-vinylphenyl)glycine, sodium salt.

The N-(ar-vinylbenzyl)-2-(p-vinylphenyl)glycine gel is dispersed in aqueous sodium hydroxide solution and therein reacted with sodium chloroacetate to obtain a polymeric N-(ar-vinylbenzyl)-2-(p-vinylphenyl)iminodiacetic acid salt.

*Example 4*

A mixture of 200 ml. of water, 50 ml. of dioxane and 47 g. of isovaline, together with a trace of hydroquinone, was heated to a temperature in the range from 55° to 60° C. in a stirred reaction vessel fitted with reflux condenser and dropping funnels. Over a period of one hour, there were concurrently added to the reaction mixture 15.3 g. of ar-vinylbenzyl chloride and 31.2 g. of sodium hydroxide. The ar-vinylbenzyl chloride was a mixture of approximately 65 percent by weight p-vinylbenzyl chloride and 35 percent o-vinylbenzyl chloride.

After an additional hour of stirring, the reaction mixture was diluted with an equal volume of water and then was extracted with chloroform. The extracted water solution was acidified with hydrochloric acid to a pH value of 5.5, whereupon a white solid precipitate formed. The solid was collected, washed and dried to obtain 9.7 g. of N-(ar-vinylbenzyl)isovaline, i.e. a mixture of N-(p-vinylbenzyl)isovaline and N-(o-vinylbenzyl)isovaline in proportions corresponding to the mixture of isomers in the starting material.

An alkaline (sodium hydroxide) solution of the N-(ar-vinylbenzyl)isovaline (10 percent by weight) and $\alpha,\alpha'$-azobisisobutyronitrile (0.2 percent by weight) was heated at 70° C. for four days to obtain polymerized N-(ar-vinylbenzyl)isovaline, sodium salt.

A polymeric N-carboxymethyl-N-(ar-vinylbenzyl)-isovaline is obtained by reacting sodium chloroacetate in the presence of sodium carbonate in an aqueous reaction mixture with the polymerized N-(ar-vinylbenzyl)isovaline just described.

*Example 5*

N-(ar-vinylbenzyl)aspartic acid was prepared by the following procedure. A solution of 34 g. of ar-vinylbenzyl amine hydrochloride in 200 ml. of water was made alkaline by addition thereto of a solution of 9.6 g. of sodium hydroxide in 80 ml. of water. The liberated ar-vinylbenzyl amine was extracted from the aqueous mixture with one 60-ml. and two 40-ml. portions of ether. After drying over anhydrous $Na_2SO_4$, the combined ether solutions were added to 68.8 g. of diethyl maleate. The resulting mixture was allowed to stand at room temperature for six days, after which 200 ml. of water and 16 ml. of concentrated hydrochloric acid were added with agitation. The ethereal layer was withdrawn and the aqueous layer was extracted with 20 ml. of ether. The aqueous layer was made strongly basic with 50 percent by weight sodium hydroxide, thereby precipitating an oil. The oil was extracted from the aqueous solution with two 20-ml. portions of ether. The ether extract was dried over anhydrous $Na_2SO_4$. Evaporation of the ether produced 49.1 g. of crude diethyl N-(ar-vinylbenzyl)aspartate. A mixture of 49.1 g. of the crude ester, 16.1 g. NaOH, and 150 ml. of water was heated under reflux for approximately three hours until the oily layer disappeared. The hydrolysis mixture was acidified to a pH value of approximately 2 by addition thereto of hydrochloric acid. The solid precipitate was collected, washed, and recrystallized from 70 ml. of boiling water. The recrystallized product was collected, washed and dried to obtain 30 g. of N-(ar-vinylbenzyl)aspartic acid.

A solution of 0.25 g. of the N-(ar-vinylbenzyl)aspartic acid and 0.003 g. of sodium persulfate in 25 ml. of water was heated to reflux. After 23 hours, 0.003 g. of sodium persulfate was added, and reflux was continued for 27 hours to obtain 0.18 g. of tan-colored, resinous polymerized N-(ar-vinylbenzyl)aspartic acid.

To a suspension of 2.0 g. of particles of the polymerized N-(ar-vinylbenzyl)aspartic acid in water, there were added 1.5 g. of chloroacetic acid and sodium carbonate to make the pH value in the range of from 8 to 9. The suspension was heated on a steam bath for 30 hours, during which the pH value was maintained in the range from 8 to 9 by addition of small amounts of sodium carbonate from time to time as needed. The suspension was then filtered, and the resin particles were washed successively with concentrated hydrochloric acid, water and acetone and were then dried. There was thereby obtained 2.07 g. of resinous polymeric N-carboxymethyl-N-(ar-vinylbenzyl)aspartic acid.

*Example 6*

By way of specific illustration of the use of these chelating resins, the particles of polymeric N-(ar-vinylbenzyl)-iminodiacetic acid prepared in accordance with Example 1 were placed in a vertical tube and a dilute solution of cupric chloride was passed through the resin bed. The effluent was free of cupric copper ions until the resin bed was converted to the copper chelate form. The exhausted resin was readily regenerated by elution with strong acid, e.g. hydrochloric acid. In such a cycle, the capacity of the polymeric $\alpha$-aminocarboxylic acid resin bed was 3.7 millimoles of cupric copper ion per gram of the resin. In similar manner, the resin can remove from solutions passed therethrough ions of cobalt, iron, nickel, mercury, calcium and like chelate-forming metals.

I claim:

1. A method of making chelating resins having an appreciable proportion of the recurring group

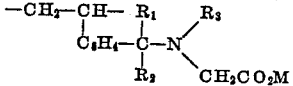

which comprises polymerizing by heating with a free-radical generating addition polymerization catalyst a polymerizable ethylenically unsaturated monomeric composition comprising an appreciable proportion of at least one monomeric vinylbenzylamino compound having the formula

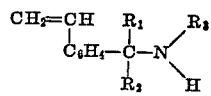

wherein the symbol $R_1$ represents a radical selected from the group consisting of —H, —$CO_2M$, and —$CH_2CO_2M$, the symbol $R_2$ represents a radical selected from the group consisting of —H and —$CH_3$, the symbol $R_3$ represents a radical selected from the group consisting of —H, —$CH_3$, —$CH_2$—$C_6H_4$—$CH$=$CH_2$, —$CH_2CO_2M$,

—$CH_2CH_2CO_2M$, —$CH(CO_2M)CH_2CO_2M$

—$CH_2CH_2$—$N(CH_2CO_2M)_2$

—$CH_2CH_2CH_2$—$N(CH_2CO_2M)_2$ and

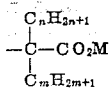

where $n$ is an integer from 1 to 4 and $m$ is an integer from 0 to 2, and M is a member of the group consisting of hydrogen, ammonium bases, and metals, thereby obtaining a resinous addition polymer having therein an appreciable proportion of the recurring group

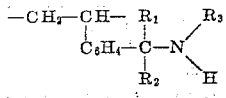

dispersing that resinous polymer and a haloacetic acid selected from the group consisting of chloroacetic acid and bromoacetic acid into an alkaline aqueous liquid reaction mixture and reacting the resinous polymer with the haloacetic acid until the —NH— groups in the resinous polymer are substantially converted to N-carboxymethyl groups.

2. A method according to claim 1 wherein the haloacetic acid is chloroacetic acid.

3. A method according to claim 1 wherein the vinylbenzylamino compound is ar-vinylbenzylamine.

4. A method according to claim 1 wherein the haloacetic acid is chloroacetic acid and the vinylbenzylamino compound is ar-vinylbenzylamine.

References Cited in the file of this patent
UNITED STATES PATENTS

| | | |
|---|---|---|
| 2,632,000 | McMaster et al. | Mar. 17, 1953 |
| 2,739,949 | Forshey | Mar. 27, 1956 |
| 2,765,284 | Bersworth | Oct. 2, 1956 |

UNITED STATES PATENT OFFICE

CERTIFICATE OF CORRECTION

Patent No. 2,888,441            May 26, 1959

Leo R. Morris

It is hereby certified that error appears in the printed specification of the above numbered patent requiring correction and that the said Letters Patent should read as corrected below.

Column 1, line 32, for that portion of the formula reading

"—$CH_2CH_2CH$—" read -- —$CH_2CH_2CH_2$— --; column 4, line 65, for

"nitriloacetic" read -- nitrilotriacetic --.

Signed and sealed this 17th day of November 1959.

(SEAL)
Attest:

KARL H. AXLINE
Attesting Officer

ROBERT C. WATSON
Commissioner of Patents